United States Patent

Bradshaw et al.

Patent Number: 5,652,490
Date of Patent: Jul. 29, 1997

[54] CONTROL SYSTEM FOR GLASSWARE FORMING MACHINE

[75] Inventors: Alan Bradshaw, Glossop; John Counsell, Wirral; Philip A. Mann, Ponterfract; Neil J. Plater, Doncaster, all of United Kingdom

[73] Assignee: Emhart Glass Machinery Investments Inc., Wilmington, Del.

[21] Appl. No.: 608,987

[22] Filed: Feb. 29, 1996

Related U.S. Application Data

[63] Continuation of Ser. No. 244,139, filed as PCT/GB93/00477, Mar. 8, 1993, abandoned.

[30] Foreign Application Priority Data

Mar. 11, 1992 [GB] United Kingdom .................. 9205254

[51] Int. Cl.$^6$ .................................................. G05B 5/01
[52] U.S. Cl. .......................... 318/615; 318/560; 65/163; 364/473.01
[58] Field of Search .................. 65/160, 163–164; 318/560, 561, 3, 600–601, 615–618; 364/473.01, 473.02

[56] References Cited

U.S. PATENT DOCUMENTS

| 3,634,660 | 1/1972 | Moran et al. | 318/568 |
|---|---|---|---|
| 4,351,663 | 9/1982 | Wood | 65/66 |
| 4,367,087 | 1/1983 | Franco et al. | 65/163 |
| 4,459,146 | 7/1984 | Farkas et al. | 65/29 |
| 4,499,920 | 2/1985 | Steffon et al. | 318/685 |
| 4,590,966 | 5/1986 | Figueroa et al. | 137/596.17 |
| 4,599,101 | 7/1986 | Douglas et al. | 65/164 |
| 4,662,600 | 5/1987 | Schwelm | 250/30.03 |
| 4,679,148 | 7/1987 | Wood | 65/163 |
| 4,705,552 | 11/1987 | Liska et al. | 65/158 |

FOREIGN PATENT DOCUMENTS

| 0040075 | 5/1981 | European Pat. Off. . |
| 2159813 | 6/1984 | United Kingdom . |

*Primary Examiner*—David S. Martin
*Attorney, Agent, or Firm*—Spencer T. Smith

[57] ABSTRACT

A control system for controlling displacement of a member in a glassware forming machine. A pneumatic piston drives the member and is controlled by a computer which defines a motion profile. The difference, at any moment, between the demanded position and the actual position is determined and an error signal is defined based on the difference signal and the momentary velocity and acceleration.

7 Claims, 5 Drawing Sheets

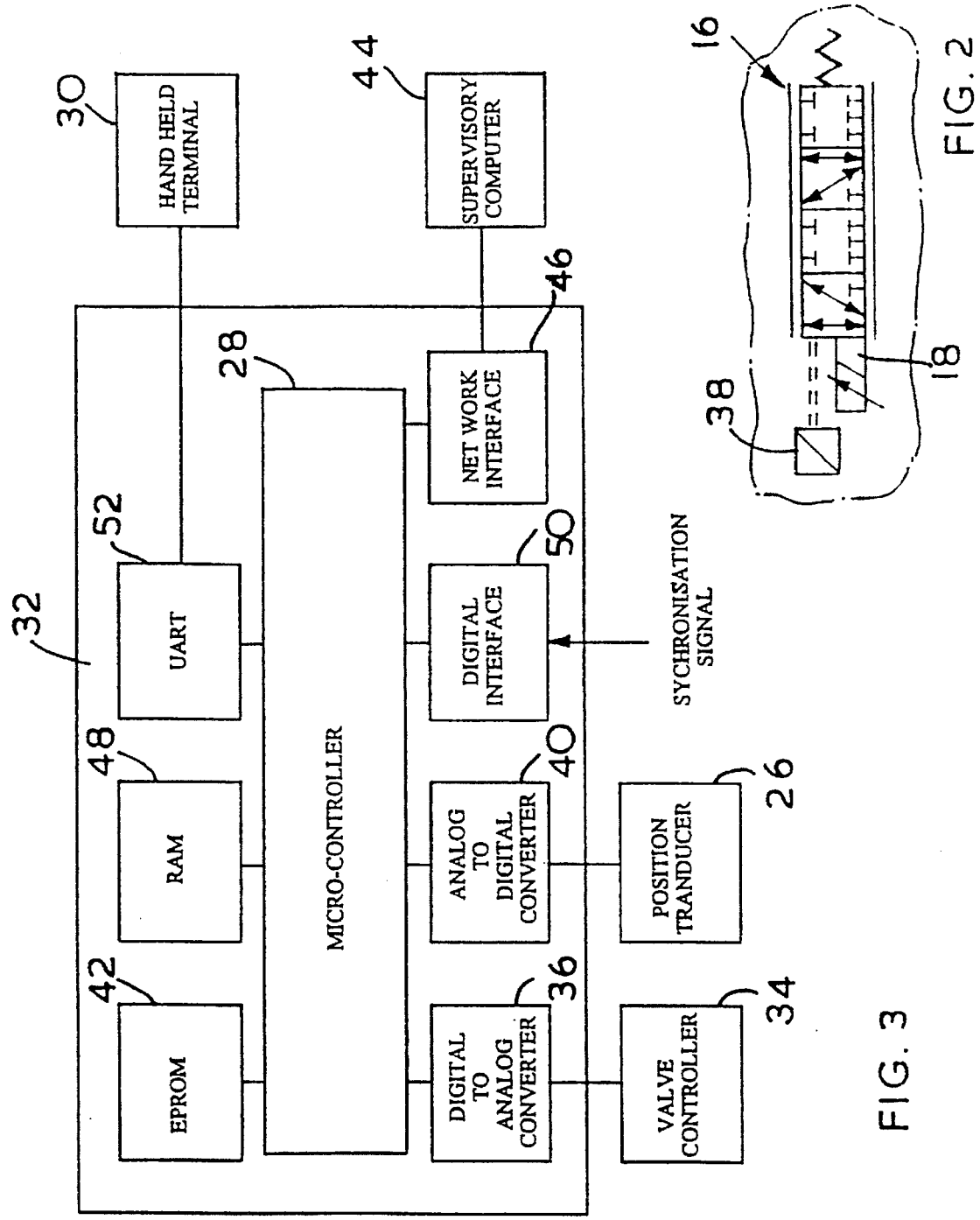

CONTROL SYSTEM FOR GLASSWARE FORMING MACHINE

This is a continuation of application Ser. No. 08/244,139, filed as PCT/GB93/00477, Mar. 8, 1993, now abandoned.

FIELD OF THE INVENTION

This invention relates to a control system suitable for use in a glassware forming machine, and in particular, to an electronically controlled pneumatic valve for controlling the movement of a moveable member in such a machine.

BACKGROUND OF THE INVENTION

In a common type of glassware forming machine, a gob of molten glass is formed, at a blank station, into a parison. The parison is transferred to a blow station at which it is blown into a container, and the blown container is then removed from the machine to a cooling station and thence to a conveyor.

The parison, when it is transferred from the blank station to the blow station, and the blown container when it is moved from the blow station to the cooling station, are readily deformable. Consequently, movement of the parison and the blown container has to be very carefully controlled to avoid distortion or damage, while at the same time such movement needs to be carried out as quickly as possible to obtain the maximum output from the machine. An invert mechanism carries the parisons of hot glass from the blank station through about 180° about a horizontal axis to the blow station.

A take out mechanism picks the blown containers up from the blow station and moves them, in a vertical orientation, through an arcuate path to the cooling station.

Critical control of the movement of the take out mechanism and of the invert mechanism is necessary to avoid distortion of the still soft glass due to any sudden uncontrolled motion.

There are certain other mechanisms in a glassware forming machine where, for other reasons, critical control of the movement of a mechanical member is desirable. An example of this is the movement of the plunger in a parison forming operation, which needs to be closely controlled to avoid the development of excessive pressure on the glass. Other mechanisms will benefit from critical control of their movement, in that faster and more precise operation and a longer life can thus be obtained.

OBJECT OF THE INVENTION

It is one object of the present invention to provide a control system which enables the aforesaid critical control to be achieved.

BRIEF DESCRIPTION OF THE DRAWINGS

The invention will now be described by way of example, with reference to the accompanying drawings, in which:

FIG. 2 indicates schematically the construction of the control valve shown in FIG. 1;

FIG. 3 is a block diagram of a servo control card and associated components;

DETAILED DESCRIPTION OF THE PREFERRED EMBODIMENT

Figure 1:
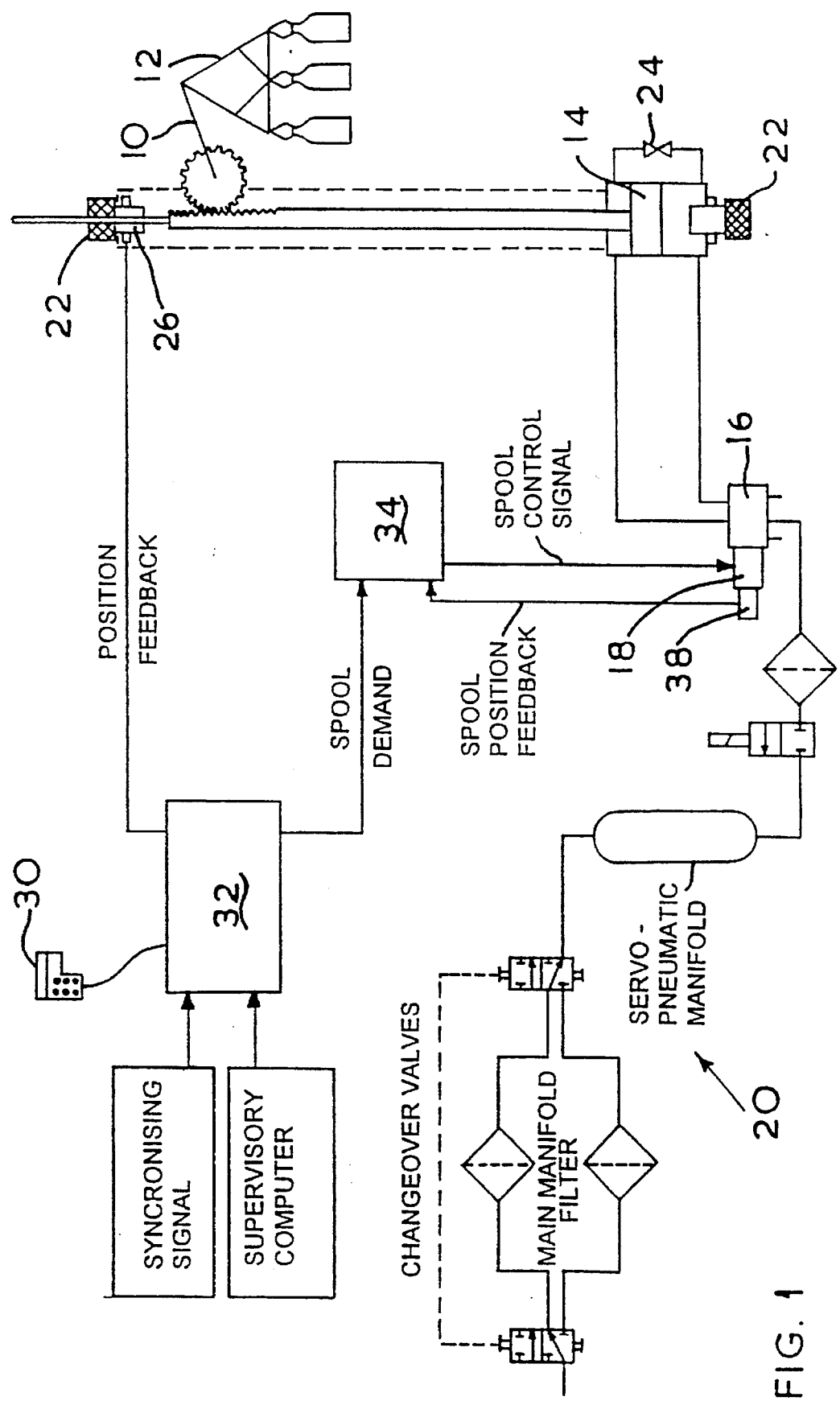
FIG. 1 is a schematic diagram of a pneumatic servo take out mechanism for glassware for a glassware forming machine.

Referring to FIG. 1, the illustrated take out mechanism comprises a driven member in the form of a pinion mounted arm 10 carrying tongs 12 adapted to grip three formed containers at a blow mold station. The arm 10 is displaceable about the pivot axis of the pinion by a piston 14 by the rack portion of a pneumatic piston and cylinder device. This device is controlled by a proportional pneumatic valve 16 which is operated by a solenoid 18 supplied with appropriate control signals. The arm 10 can accordingly be swung upwardly and over to transfer the glassware from the molding station to a cooling station. Details of the porting of valve 16 is given in FIG. 2. Having set the glassware down at the cooling station, the tongs are released and the arm is returned under pneumatic control to pick up the next three formed containers at the molding station.

There is a pneumatic air supply to the valve 16 generally referenced 20, adjustable end stops 22 providing safety in the event of a failure of the control pneumatics and a bypass valve 24.

The solenoid 18 which operates the proportional pneumatic valve 16 is supplied with control signals supplied by processing electronics which throughout each cycle receives input from a position transducer 26 associated with the piston.

A servo control card 32 (FIG. 3) provides a signal processing system incorporating a memory in which a motion profile is stored, which processing system throughout each cycle receives as a feedback from the transducer the position of the driven member and which produces control signals for the valve in accordance with a repetitive algorithm which takes account not only of the displacement of the driven member from the motion profile but also of the instantaneous velocity and acceleration of the driven member so that the valve supplies air to the piston and cylinder device to cause the member to move from rest at the first position to rest at the second position without exceeding permitted maximum values of acceleration. This comprises a micro-controller 28 which is connected to a valve controller 34 and provides spool position demand signals to the valve controller 34 through a digital/analog converter 36.

The micro-controller 28 is connected through an analog/digital converter 40 to the position transducer 26 which provides signals indicating the actual position of the mechanism, and is also connected to an EPROM 42 and RAM 48 in either of which the profile program for the mechanism movement is stored.

The machine comprises a supervisory computer 44 which is connected through a network interface 46 to the micro-controller 28 and then to a RAM 48 to which the algorithm information is passed and stored and which is accessed by the micro-controller 28 at appropriate times. The synchronization signal is supplied to the micro-controller 28 through a digital interface 50. Alternatively, the micro-controller 28 can provide the synchronization signal internally.

A UART (Universal Asynchronous Receiver Transmitter) 52 is connected to a Hand Held Terminal (HHT) 30 and to the RAM 48 to allow the constant factors of the algorithm program to be adjusted to enable the actual profile to be followed to be modified. These factors are provided to the micro-controller 28. Thus, the micro-controller 28 takes the profile program from the EPROM 42 or RAM 48, the algorithm program from the EPROM 42 or RAM 48, and the individual factors from the EPROM 42, RAM 48, UART 52, or Supervisory Computer 44 and combines them to enable it repetitively to use the algorithm program and profile program to enable it to provide the necessary position demand signals to the valve controller 34.

An operator interface is provided. The embodiment uses the HHT 30 or the Supervisory Computer 44. If desired, the HHT 30 can be dispensed with and the necessary individual factors provided from the Supervisory Computer 44.

The Supervisory Computer 44 comprises display means which is arranged to display motion profile data. The HHT 30 is connected to the card 32 and by its operation the motion profile data can be modified.

The valve controller 34 and the valve 16 form a servo system, the controller 34 receiving a feedback signal indicating the actual spool position from a sensor 38 and developing the actual valve control signals from the valve spool demand signals supplied by the micro-controller 28 and the feedback signals from the sensor 38.

One algorithm (the first algorithm) which may be used to generate an output signal OP to control the mechanism, is defined as follows:

$$OP=KP^* (E^* (ABS(ATAN(^*KN1))+KN2))-(Kd^*V+Kdd^*A)$$

where
OP is the output signal for the valve
KP is the proportional gain
E is the position error
KN1 is the "sharpness" parameter
KN2 is the "base value" parameter
Kd is the first differential gain
V is the velocity estimate
Kdd is the second differential gain
A is the acceleration estimate The output value is clipped to the physical limits of the system before being used to actuate the valve, thus: if the computed value OP is greater than 10, make OP=10, and if the computed value OP is less than −10, make OP=−10.

For all intermediate values, the actual value of OP is used to actuate the valve.

An OP value of 10 causes the multi port proportional valve to move fully in one direction which vents the cylinder volume on a first side of the piston to atmosphere while the other second side of the piston is fully open to the supply pressure. An OP value of −10 causes the multi port proportional valve to move fully in the opposite direction which connects the cylinder volume on the first side of the piston fully open to the supply pressure, while the second side of the piston is fully vented to the atmosphere.

The error is defined by:

$$E=D-P$$

Where
D is the demanded position and
P is the actual position.

At start up, in order to avoid a jolt, the values of V and A at start up position (PZ1) must all equal zero, i.e., VZ1, VZ2, AZ1 and AZ2 are all set to zero where
PZ1 is the previous position
VZ1, VZ2 are the two previous velocity estimates
AZ1, AZ2 are the two previous acceleration estimates
At time zero=OP (O)=KP* (E* (ABS [ATAN (E*KN1)] +KN2))

The equations which have been chosen for obtaining velocity (V) and acceleration (A) estimates are as follows:

$$V=((N1^*ITR)^* (P-PZ1))+((D1^*VZ1)+(D2^*VZ2))$$

$$A=((N1^*ITR)^* (V-VZ1))+((D1^*AZ1)+(D2^*AZ2))$$

where D1 and D2 are the appropriate difference coefficients, ITR is the iteration frequency and N is a chosen integer.

The above equations produce smoothed velocity and acceleration estimates, and allow sensible values to be obtained in the presence of a small amount of noise on the position signal.

The effect of a large amount of noise would be to swamp the valve control signal. Reduction of the noise by smoothing involves the penalty of a time delay.

The parameters ITR, N1, D1 and D2 can be tuned to give an acceptable compromise between noise and time delay.

The effect of increasing the time delay in the velocity and acceleration estimates is that the mechanism becomes less stable, less stiff, and more vulnerable to oscillation.

The use of these equations for velocity and acceleration estimates has enabled the problem of noise in the position signal to be overcome, and has enabled a Servo-pneumatic take out mechanism with a single robust transducer to be constructed.

It has been found that with the quality of feedback compensation available using the signal from the chosen transducer, the error gain term of the algorithm has to be kept low in order to avoid problems with the mechanism oscillating and overshooting. This restricts the speed of movement of the mechanism.

A preferred solution to this problem is to vary the gain on the position error according to the magnitude of the position error.

This is achieved by the driving part of the algorithm, namely: KP* E* (ABS(ATAN (E*KN1))+KN2).

The driving part of the algorithm ensures that when the error is large the valve is opened fully to drive the mechanism quickly towards reducing the error. When the error is small, i.e., the mechanism approaches the desired position, the gain on the position error is reduced.

Preferably the gain on the error is reduced to a level where the differential feedback is sufficient to prevent oscillation and overshoot.

KN1 is termed the "sharpness" parameter. Increasing the value of this "sharpness" parameter causes the gain on the position error to rise more sharply as the error grows.

KN2 is the "base value" below which the gain on the error term never falls.

An alternative (second) algorithm which may be used in place of algorithm 1 to generate an output signal OP to control the mechanism is:

$$OP=I-F+RKV^*D$$

where
I is the integral of the position error
F is the feedback compensation
RKV is the feed forward or "kicker" gain
D is the demand position from the motion profile.

Preferably, the output OP is clipped as for algorithm 1.

Also, as with the first algorithm, the second algorithm is executed one every 1/ITR of a second.

The "kicker" is used to compensate for slow initial response due to the time required for the integral term to build up.

The term "F" is the Feedback Compensation.

$$F=RKP^*P+RKd^*V+RKdd^*A$$

where

RKP is the proportional action gain

RKd is the differential action gain

RKdd is the second differential action gain V and A are the velocity and acceleration estimates, which are obtained in the same way as for algorithm 1. Tuning to achieve a compromise between noise and the time delay may be applied as described with reference to the first algorithm.

The non-linear integral action works as follows:

$$I=II+(1/TTR)*RKI*E$$

where

II is the integral of the error history.

RKI is the integral action gain

E is the position error, and $$E=D-P$$

where P is the present position.

Clipping is preferably performed on the complete value for OP at this stage as described in relation to algorithm 1.

Another important feature of the algorithm is the conditioning of the integrator. A problem known as "integrator windup" can occur if this conditioning is not done. In this case, the conditioning that is done is to set I equal to II if clipping of OP value is required.

Conveniently, the integral term is updated after each iteration, thus:

$$I(N)=II(N-1).$$

A major advantage of this second algorithm is that it is able to compensate for leakage within the valve, or for leakage within the mechanism. Steady state error is eliminated because any positional error due to leakage is integrated until the algorithm is able to eliminate it. The valve signal will continue to build as the mechanism chases the desired position.

It is a feature of both algorithms that they are able to cope well with non-linearities. The non-linearity associated with the finite capacity of the valve is no problem.

Where the maximum through put of the control valve does not result in too large an acceleration, then the valve can be fully opened to achieve the fastest possible acceleration and velocities.

The motion profile describes the desired motion of the member. Establishment of the profile is therefore very important.

Conveniently, computer means is employed to display and modify motion profile data and corrections to the latter are entered either via a keyboard or a manually operable unit such as a mouse or joystick or light pen or hand held terminal.

Figure 4:
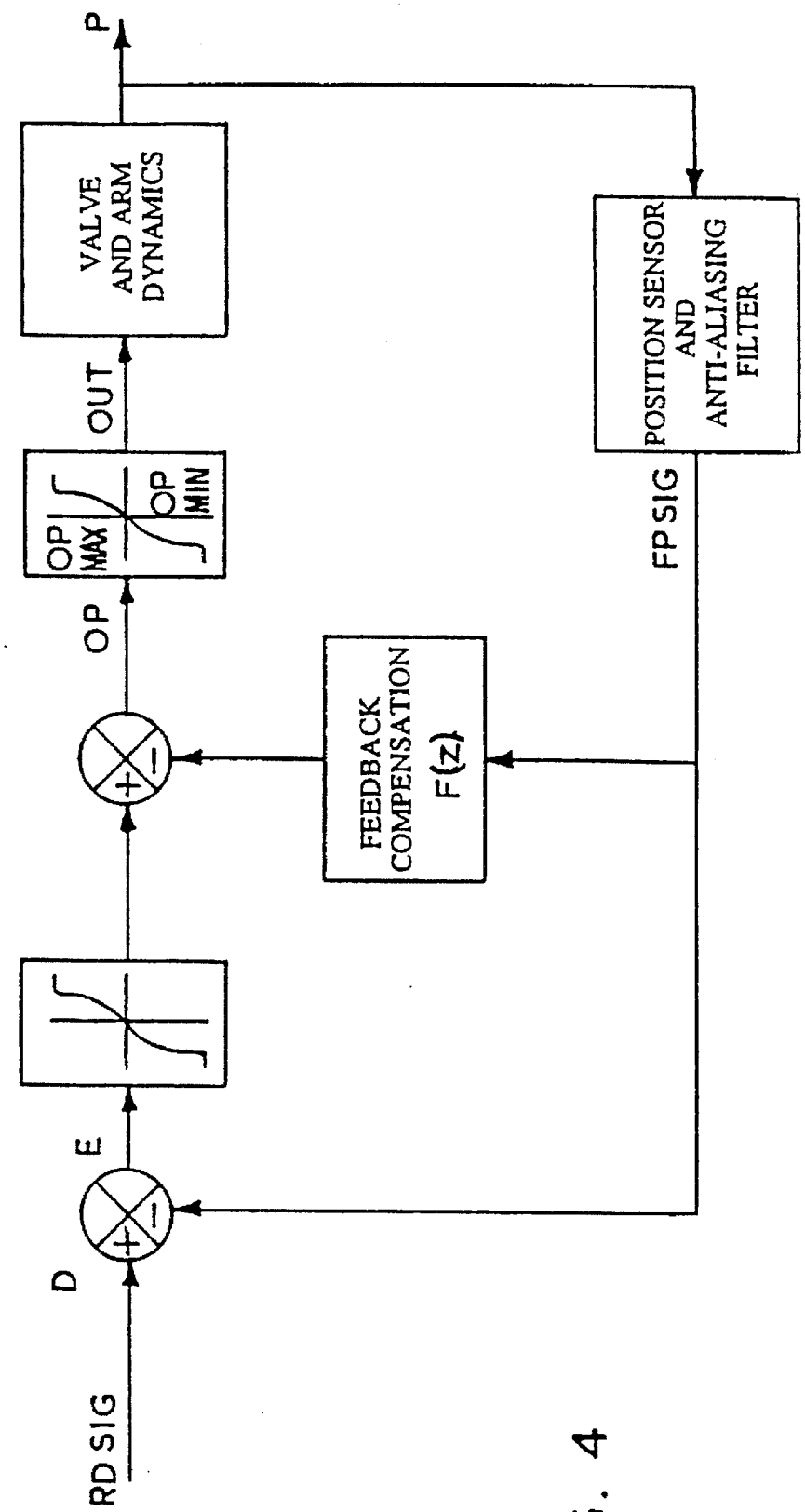
FIGS. 4 and 5 illustrate algorithms identified herein as ALGORITHM 1 AND ALGORITHM 2.
Figure 5:
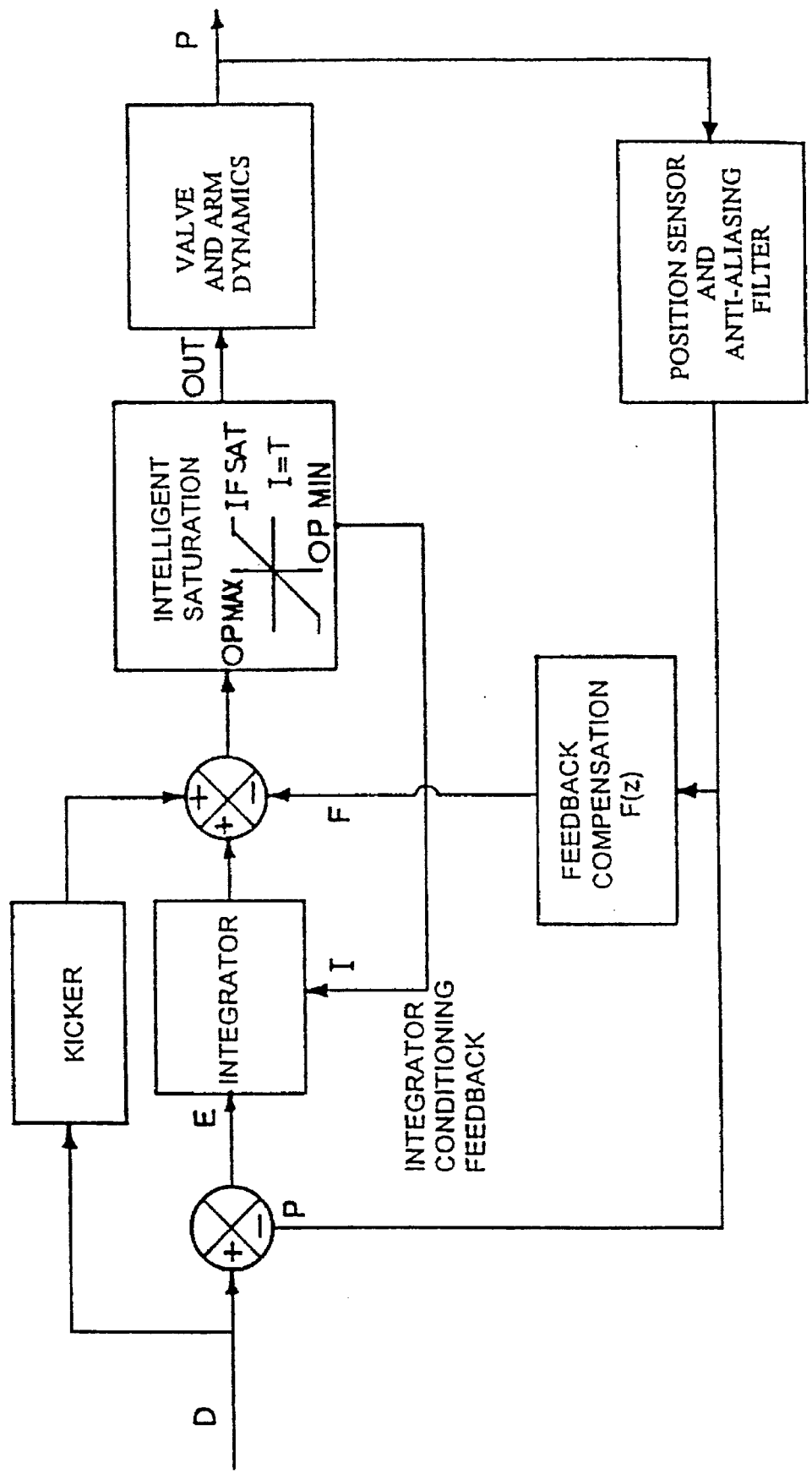

The flow chart for ALGORITHM 1 is shown in FIG. 4 and that for ALGORITHM 2 in FIG. 5.

In FIG. 4 a summing junction receives the demand signal and the actual position signal (the feedback position signal—FP SIG) and determines the error E. The error signal is clipped by a clipper which limits the error to a ± max value. Another junction receives the error signal and determines OP from the first algorithm. A second clipper limits OP to a ± maximum value and the value outputted from the second clipper drives the valve and arm dynamics. This first algorithm includes a number of gains and parameters. Such gains and parameters in control algorithms generally are introduced to line an algorithm and conventionally are determined with experience.

In FIG. 5 a first junction determines the error E which is supplied with I to an integrator which also functions as the clipping element. The second junction calculates OP based on the second algorithm and OP is limited to ± a maximum value by a second clipper which if saturated, defines I=II. "T" in FIG. 5 is incorrect and should, per the specification, be "II." This correction will be made when corrected formal drawings are submitted. The outputted OP signal drives the Valve and Arm Dynamics. In both algorithms the actual position P is sensed and fed back by a Position Sensor and Anti-Aliasing Filter. Again, the gains are conventional tools for tuning the algorithm.

Figure 6:
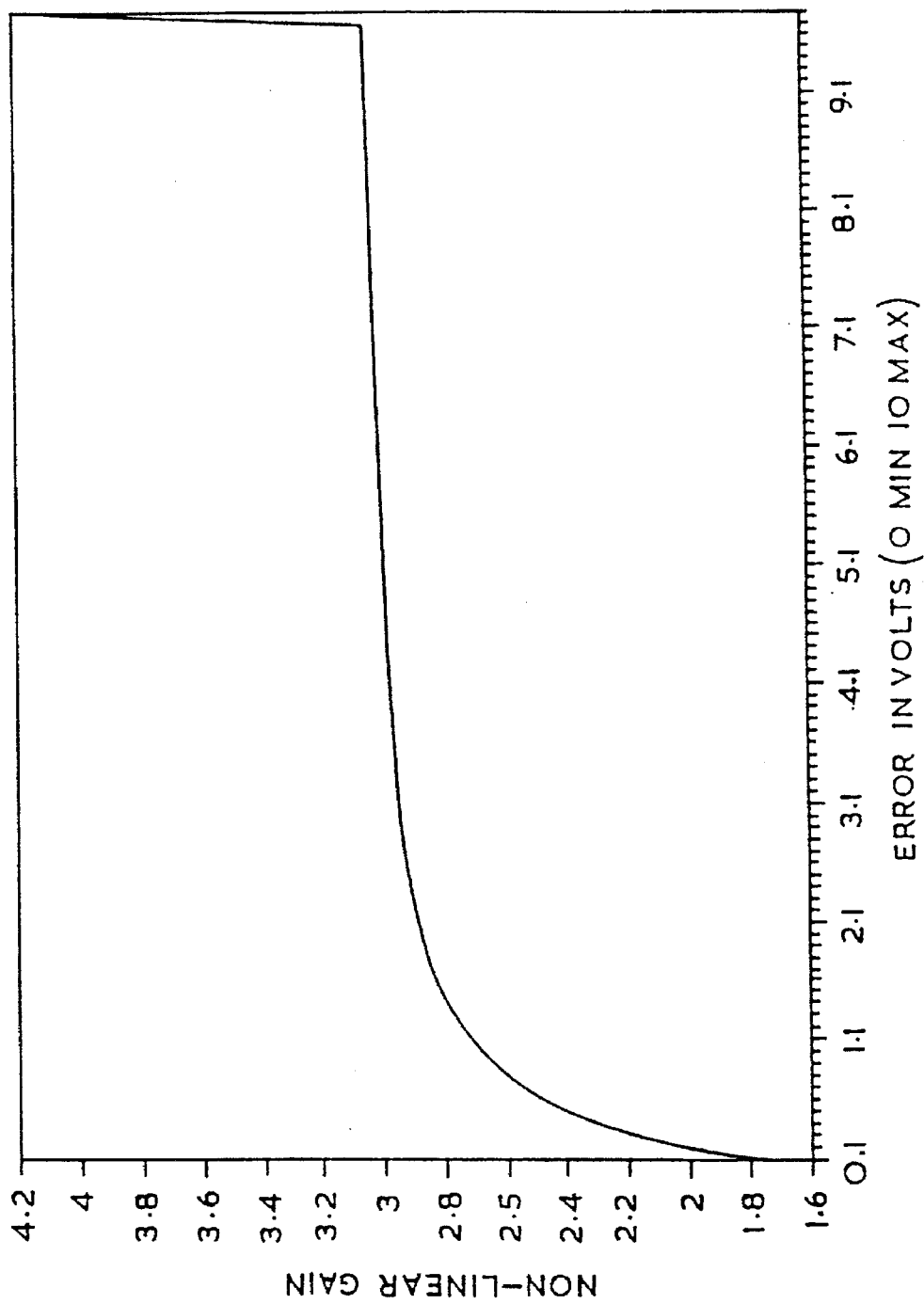
FIG. 6 is a graphical representation of gain to error for a selected value of KN1.

FIG. 6 shows the variation of gain relative to position error for selected values of "sharpness" parameter KN1.

The value of the base value of the gain (below which the error term never falls) exceeds 1.5.

Increasing the value of KN1 causes the gain on the position error to rise more sharply as the error grows.

We claim:

1. A control system for controlling the displacement of a member in a glassware forming machine which is to be displaced from a first to a second position comprising a pneumatic piston and cylinder device drivingly connected to the member and operable when air under pressure is supplied to said piston to displace the member from said first position to said second position, a proportional pneumatic valve including a solenoid displaceable to control the supply of air to said piston, a transducer for continuously issuing a signal representative of the position of the driven member as it is displaced from said first position to said second position, a valve controller for controlling the displacement of said solenoid, and a computer including means for defining a demand position for displacing said solenoid in accordance with a selected motion profile from said first position to said second position, and means for continuously determining the velocity of the member as it is displaced from said first position to said second position, means for continuously determining the acceleration of the member as it is displaced from said first position to said second position, means for continuously determining the difference between the actual position of the member and the demanded position, and means for generating an output signal for said valve controller defined by the following equation:

$$OP=KP*(E*(ABS(ATAN(E*KN1))+KN2))-(Kd*V+Kdd*A)$$

where

OP is said output signal;

KP is the proportional gain;

E is the difference between the actual and demand positions;

KN1 is the "sharpness" parameter;

KN2 is the "base value" parameter;

Kd is the first differential gain;

V is the determined velocity;

Kdd is the second differential gain; and

A is the determined acceleration.

2. A control system according to claim 1, further comprising clipping means for limiting said demand position to selected maximum and minimum values.

3. A control system according to claim 2, further comprising clipping means for limiting OP to selected maximum and minimum values.

4. A control system for controlling the displacement of a member in a glassware forming machine which is to be displaced from a first to a second position comprising

- a pneumatic piston and cylinder device drivingly connected to the member and operable when air under pressure is supplied to said piston to displace the member from said first position to said second position,
- a proportional pneumatic valve including a solenoid displaceable to control the supply of air to said piston,
- a transducer for continuously issuing a signal representative of the position of the driven member as it is displaced from said first position to said second position,
- a valve controller for controlling the displacement of said solenoid, and
- a computer including
  - means for defining a demand position for displacing said solenoid in accordance with a selected motion profile from said first position to second position,
  - means for continuously determining the velocity of the member as it is displaced from said first position to said second position,
  - means for continuously determining the acceleration of the member as it is displaced from said first position to said second position,
  - means for continuously determining the difference between the actual position of the member and the instructed position, and
  - means for generating an output signal for said valve controller defined by the following equation:

$$OP = I - F + RKV \times D$$

where

OP is the output signal for the valve controller;

$$I = II + (1/ITR) \times RKI \times E$$

where

E is the Error

II is the integral of the error history

RKI is the integral action gain $$F = RKP \times P + RKd \times V + RKdd \times A$$

where

RKP is the proportional action gain

RKd is the differential action gain

RKdd is the second differential action gain

V = velocity

A = acceleration

P is the actual position

D is the demand position.

RKV is the feed forward or kicker gain.

5. A control system according to claim 4, further comprising clipping means for limiting said demand position to selected maximum and minimum values.

6. A control system according to claim 5, further comprising clipping means for limiting OP to selected maximum and minimum values.

7. A control system according to claim 6, wherein said clipping means is an integrator.

* * * * *